UNITED STATES PATENT OFFICE.

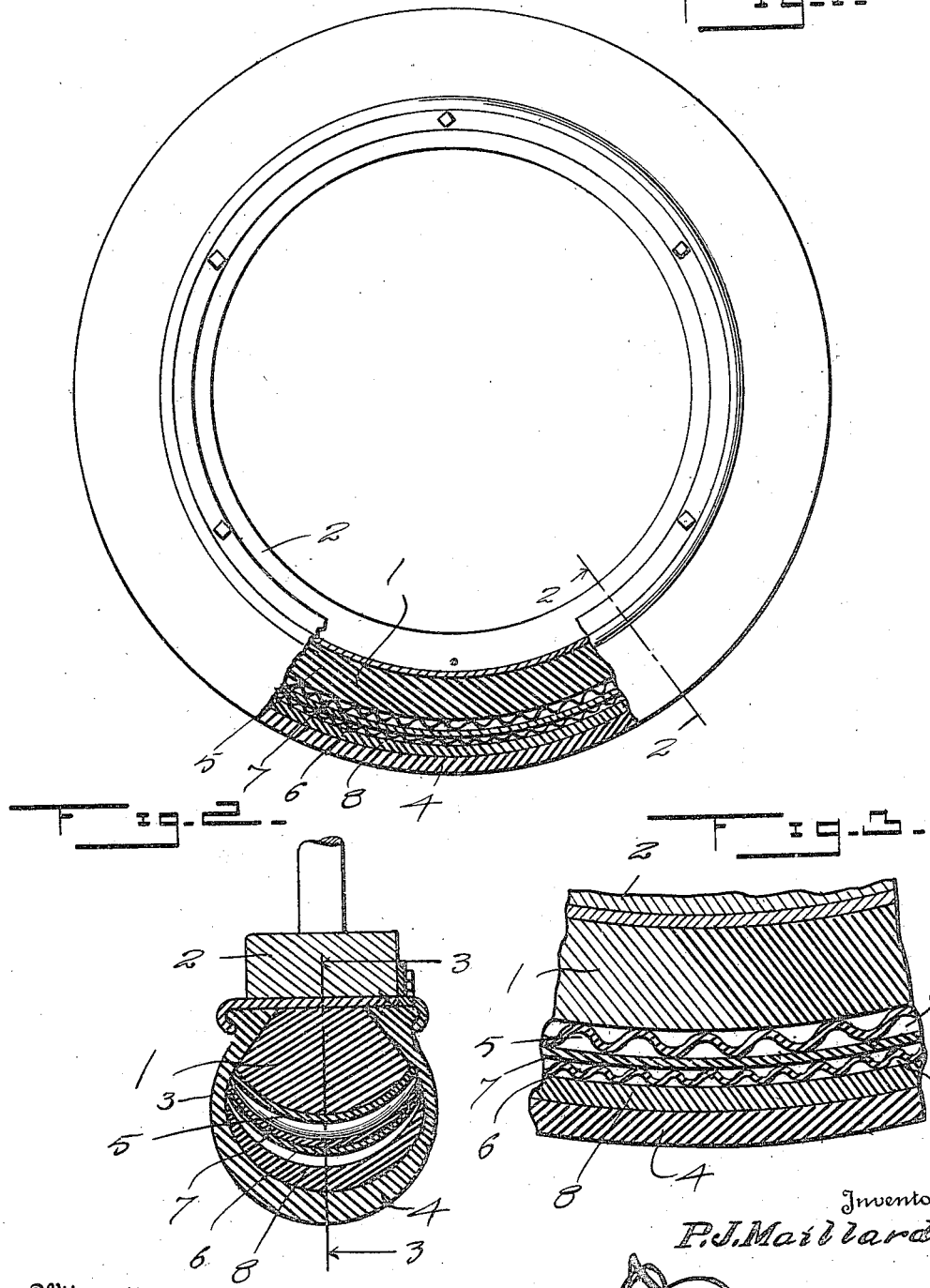

PETER J. MAILLARD, OF JEANERETTE, LOUISIANA.

TIRE FOR AUTOMOBILES, &c.

1,259,256.  Specification of Letters Patent.  Patented Mar. 12, 1918.

Application filed July 24, 1917. Serial No. 182,460.

*To all whom it may concern:*

Be it known that I, PETER J. MAILLARD, a citizen of the United States, residing at Jeanerette, in the parish of Iberia and State of Louisiana, have invented certain new and useful Improvements in Tires for Automobiles, &c.; and I do hereby declare the following to be a full, clear, and exact description of the invention, such as will enable others skilled in the art to which it appertains to make and use the same.

The invention relates to a tire for automobiles and other motor vehicles.

The object of the present invention is to improve the construction of tires for automobiles and various other motor vehicles and to provide a simple, practical and efficient tire of strong, durable and inexpensive construction designed for use on trucks and heavy motor vehicles as well as the lighter class of automobiles and adapted to eliminate tire trouble and capable of affording a relatively high resiliency for absorbing and dissipating shocks and jars.

With these and other objects in view, the invention consists in the construction and novel combination of parts hereinafter fully described, illustrated in the accompanying drawing and pointed out in the claims hereto appended; it being understood that various changes in the form, proportion, size and minor details of construction, within the scope of the claims, may be resorted to without departing from the spirit or sacrificing any of the advantages of the invention.

In the drawing:

Figure 1 is a side elevation partly in section of a tire constructed in accordance with this invention.

Fig. 2 is a transverse sectional view of the same on an enlarged scale taken on the line 2—2 of Fig. 1.

Fig. 3 is a longitudinal sectional view of a portion of the tire on the line 3—3 of Fig. 2.

Like numerals of reference designate corresponding parts in all the figures of the drawing.

In the accompanying drawing, in which is illustrated the preferred embodiment of the invention, the tire comprises in its construction a solid rubber tire section 1 supported directly upon the rim 2 and located between the inner and base portions of the sides of an outer tube or shoe 3 of the usual construction. The outer tube or shoe may be of any desired type and it is designed to be mounted on and secured to the rim 2 in the ordinary manner. The solid elastic section 1, which tapers inwardly toward the rim, presents flat side faces to the side portions of the outer tube or shoe and it has a transversely rounded convex outer supporting face.

Interposed between the tread portion 4 of the outer tube or shoe 3 and the solid tire section 1 are spaced transversely corrugated circumferential sections 5 and 6 and resilient rings or bands 7 and 8 forming solid circumferentially arranged sections. The solid tire section 1 is preferably constructed of rubber or a composition of rubber and fabric, but any suitable material may be employed in the construction of the same, as will be readily understood. The inner corrugated section, which extends circumferentially around the tire in the form of a layer by being transversely corrugated, forms a plurality of transverse grooves or openings 9 which provide for a relatively high resilient action of the tire. The outer corrugated section, which forms transverse grooves 10, is arranged similar to the inner transversely corrugated section. These sections, which are constructed of rubber or other suitable material, are curved transversely to conform to the configuration of the rounded supporting face of the solid section 1 and the inner face of the tread portion of the outer tube or shoe. The sections may be of any desired dimensions to adapt the wheel to the character of the automobile or motor truck to which the tire is to be applied and the solid relatively thin circumferential bands or sections maintain the corrugated sections in proper form and enable the same to cushion the tire and regain their proper shape after compression and distention. The transversely corrugated sections are of uniform thickness and they may be formed in any desired manner and they are curved transversely to conform to the configuration of the tread portion of the tire.

The tire is puncture proof and it will not heat and the interior filler construction is practically indestructible as the outer covering may be renewed when worn and will prevent the filler from becoming worn or subject to wear.

What is claimed is:

1. A tire of the class described including an inner solid tire section and a plurality of alternately arranged smooth and corrugated circumferentially disposed sections curved transversely.

2. A tire of the class described including a solid inner tire section of elastic material provided with a transversely rounded supporting face, a corrugated circumferentially arranged section surrounding the inner solid section, and a relatively thin smooth section covering the corrugated section.

3. A tire of the class described including a solid inner tire section of elastic material rounded at the outer face to form a convex supporting surface, a corrugated circumferentially arranged section surrounding the inner solid section, a relatively thin smooth section covering the corrugated section, said smooth and corrugated sections being curved transversely to fit the curvature of the supporting face of the inner section, and an outer tube or shoe inclosing the said sections.

4. A tire of the class described including an outer covering or shoe, an inner solid resilient section having a rounded outer supporting surface and provided with flat inwardly converging side faces, circumferentially arranged transversely corrugated sections surrounding the inner solid section, and relatively thin circumferentially arranged smooth resilient sections inclosing the corrugated sections and confining the same, said sections being transversely curved to fit the curvature of the supporting face of the solid inner section, said corrugated sections forming transverse openings.

In testimony whereof I affix my signature in presence of two witnesses.

PETER J. MAILLARD.

Witnesses:
  E. R. JACKSON,
  C. C. EDWARDS.

Copies of this patent may be obtained for five cents each, by addressing the "Commissioner of Patents, Washington, D. C."